United States Patent
Sannodo et al.

(10) Patent No.: US 12,530,026 B2
(45) Date of Patent: Jan. 20, 2026

(54) VEHICLE CONTROL APPARATUS

(71) Applicant: TOYOTA JIDOSHA KABUSHIKI KAISHA, Toyota (JP)

(72) Inventors: Shinya Sannodo, Toyota (JP); Yuuki Sakai, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 174 days.

(21) Appl. No.: 17/954,989

(22) Filed: Sep. 28, 2022

(65) Prior Publication Data
US 2023/0102751 A1   Mar. 30, 2023

(30) Foreign Application Priority Data

Sep. 29, 2021   (JP) .................... 2021-158884

(51) Int. Cl.
G05D 1/00   (2024.01)

(52) U.S. Cl.
CPC .................. *G05D 1/0022* (2013.01)

(58) Field of Classification Search
CPC ..... G05D 1/0022; B62D 15/0285; B62D 1/00
See application file for complete search history.

(56) References Cited

U.S. PATENT DOCUMENTS

| | | | |
|---|---|---|---|
| 8,903,567 B2 | 12/2014 | Morimoto et al. | |
| 10,464,554 B2 | 11/2019 | Okamura et al. | |
| 2018/0148094 A1 | 5/2018 | Mukaiyama | |
| 2019/0302754 A1 | 10/2019 | Tsuruoka | |
| 2020/0012274 A1* | 1/2020 | Kamiya | B66F 9/24 |
| 2020/0218249 A1 | 7/2020 | Sannodo et al. | |
| 2021/0026347 A1* | 1/2021 | Nakashima | B62D 15/0285 |
| 2021/0086762 A1 | 3/2021 | Shimamoto et al. | |
| 2021/0197772 A1 | 7/2021 | Tsumano | |

FOREIGN PATENT DOCUMENTS

| | | |
|---|---|---|
| JP | 2018-86920 A | 6/2018 |
| JP | 2018-123000 A | 8/2018 |
| JP | 2019-186849 A | 10/2019 |
| JP | 2021-49845 A | 4/2021 |

\* cited by examiner

*Primary Examiner* — Anne Marie Antonucci
*Assistant Examiner* — Jingli Wang
(74) *Attorney, Agent, or Firm* — Sughrue Mion, PLLC

(57) ABSTRACT

A vehicle control apparatus comprises a radio receiver and a control unit. The radio receiver receives a terminal signal from a first terminal that a user located outside the vehicle carry. The control unit performs a remote operation control to move the vehicle in accordance with a remote operation to the first terminal. The control unit is configured to: perform the remote operation control in accordance with the remote operation, when a signal condition including a condition that the terminal signal is received is satisfied; and in a case in which the signal condition becomes unsatisfied while performing the remote operation control, continue performing the remote operation control when an unsatisfied state in which the signal condition is not satisfied has not yet continued for a predetermined extension time, and stop performing the remote operation control when the unsatisfied state has continued for the extension time.

4 Claims, 13 Drawing Sheets

VEHICLE CONTROL APPARATUS

TECHNICAL FIELD

The present disclosure relates to a vehicle control apparatus for performing a remote operation control to cause a vehicle to move in accordance with a remote operation of a user located outside the vehicle.

BACKGROUND

There has been a known vehicle control apparatus configured to perform a remote operation control.

For example, a vehicle control apparatus, (hereinafter, referred to as a "conventional apparatus") disclosed in Japanese Patent Application Laid-Open No. 2018-86920, is configured to perform a remote operation control to cause a vehicle to move in accordance with a signal relating to a remote operation transmitted from a terminal, when the terminal is located within a permissible range between a distance X1 to the vehicle and a distance X2 to the vehicle. The conventional apparatus stops/terminates the remote operation control so as to stop the vehicle when the terminal is not located within the permissible range.

SUMMARY

The conventional apparatus determines whether or not the terminal is located within the permissible range, based on the signal (terminal signal) transmitted from the terminal.

Meanwhile, the radio field strength varies in the permissible range depending on a surrounding environment of the permissible range. Thus, when the terminal is located in a part of the permissible range where a signal strength from the terminal is weak, the conventional apparatus cannot receive the terminal signal even when the terminal is located in the permissible range. In this case, the conventional apparatus determines that the terminal is not located within the permissible range and stops the remote operation control. Such a stop of the remote operation control may cause the user (e.g., driver) to feel troublesome.

The present disclosure has been made to cope with the problems described above. One of the objectives of the present disclosure is to provide a vehicle control apparatus that is capable of reducing a possibility that the remote operation control is stopped even when the terminal is located in the permissible range.

The vehicle control apparatus (hereinafter, may be referred to as "a present disclosure apparatus) comprises:
  a radio receiver (22), mounted on a vehicle (VA), configured to be capable of wirelessly receiving a terminal signal transmitted by a first terminal (23) that a user located outside the vehicle carry;
  a control unit (20, 30, 40, 50, 60) configured to be capable of performing a remote operation control to move the vehicle in accordance with a remote operation to the first terminal or to a second terminal (26) different from the first terminal, the remote operation being performed by the user located outside the vehicle.
The control unit is configured to:
perform the remote operation control in accordance with the remote operation ("Yes" at step 910, "Yes" at step 915, step 925) when a signal condition including a condition that the terminal signal is received is satisfied ("Yes" at step 705, step 720); and in a case in which the signal condition becomes unsatisfied while performing the remote operation control ("No" at step 705),
  continue performing the remote operation control ("Yes" at step 910, "Yes" at step 915, step 925) when an unsatisfied state in which the signal condition is not satisfied has not yet continued for a predetermined extension time (Text) ("No" at step 745); and
  stop performing the remote operation control (step 750, "No" at step 910, step 950) when the unsatisfied state has continued for the extension time ("Yes" at step 745).

When the first terminal is temporally located in a "weak radio wave strength/intensity area" while the remote control operation is being performed, the signal condition may become unsatisfied because the terminal signal cannot be received. Even when this situation happens, the present disclosure apparatus continues performing the remote operation control unless the unsatisfied state in which the signal condition is unsatisfied has continued for the extension time. Therefore, the remote operation control that is being performed is not suddenly terminated even when the signal condition becomes unsatisfied. Accordingly, a possibility that the user may feel troublesome due to the sudden stop of the remote operation control can be reduced.

In some embodiments, the remote operation control is prohibited from being performed when the user is located outside a permissible range (Rkyoka) that is a range within a predetermined permissible distance (Dkyoka) from the vehicle VA. The radio receiver is configured to be capable of receiving the terminal signal when the terminal signal is transmitted by the first terminal located within a receivable distance (Dkanou) from the vehicle, wherein the receivable distance (Dkanou) is shorter than the permissible distance (Dkyoka).

When the distance between the first terminal and the vehicle (the radio receiver) becomes longer than the receivable distance while the remote operation control is being performed, the signal condition becomes unsatisfied because the radio receiver cannot receive the terminal signal. Even in this case, the remote operation control is continued until the unsatisfied state continues for the extension time. Therefore, even when the distance between the first terminal and the radio receiver becomes longer than the receivable distance, the remote operation control can be continued (at least for the extension time).

In some embodiments,
  the control unit is configured to set the extension time based on a distance difference ($\Delta D$) obtained by subtracting the receivable distance from the permissible distance, and a predetermined speed.

A possibility that the first terminal is located outside of the permissible range when the unsatisfied state continues for the extension time can be decreased by setting the extension time in advance based on the distance difference obtained by subtracting the receivable distance from the permissible distance and the predetermined speed. Therefore, a possibility that the remote operation control is performed even when the first terminal is located outside the permissible range is decreased.

In the above embodiment,
  the control unit is configured to:
    set the extension time (step 1220) based on a distance difference ($\Delta D$) obtained by subtracting a terminal distance (D) that is a distance between the first terminal and the vehicle from the permissible distance (Dkyoka), wherein the terminal distance is specified based on the terminal signal, when the signal condition is satisfied ("Yes" at step 705 shown in FIG. 12); and determine whether or not the unsatisfied state has continued for the extension time that was set when the signal condition was lastly satisfied (step 745 shown in FIG. 12), when the signal condition is unsatisfied ("No" at step 705 shown in FIG. 12).

When the signal condition is satisfied, the extension time is set based on the distance difference obtained by subtracting the terminal distance from the permissible distance. When the signal condition becomes unsatisfied, whether or not the unsatisfied state has continued for the "extension time that was set when the signal condition was lastly satisfied" is determined. This can decrease a possibility that the first terminal is located outside of the permissible range when the unsatisfied state continues for the extension time. Therefore, a possibility that the remote operation control is performed even when the first terminal is located outside the permissible range is further decreased.

In some embodiments, the remote operation control is prohibited from being performed when the user is located outside a permissible range that is a range within a predetermined permissible distance from the vehicle, and wherein, the radio receiver is configured to be capable of receiving the terminal signal when the terminal signal is transmitted by the first terminal located within a receivable distance (Dkanou) from the vehicle, wherein the receivable distance (Dkanou) is longer than the permissible distance (Dkyoka), and the control unit is configured to perform the remote operation control in accordance with the remote operation ("Yes" at step 910, "Yes" at step 915, step 925), when the signal condition is satisfied ("Yes" at step 705 shown in FIG. 13), and a terminal distance (D) that is a distance between the first terminal and the vehicle is equal to or shorter than the permissible distance ("Yes" at step 1310), wherein the terminal distance is specified based on the terminal signal.

Even when the receivable distance is longer than the permissible distance, a case may occur where the signal condition is not satisfied temporally, since the first terminal happens to be located in the "weak signal strength area Awk". The above embodiment can decrease a possibility that the remote operation control that has been being executed is suddenly terminated in such a case.

In the embodiment described above, the control unit is configured to stop performing the remote operation control regardless of whether or not the unsatisfied state continues for the extension time (step 750 shown in FIG. 13, "No" at step 910, step 940), when the signal condition is unsatisfied ("No" at step 705 shown in FIG. 13) and the terminal distance specified based on the terminal signal that lastly satisfied the signal condition is longer than a predetermined threshold distance ("No" at step 1315).

According to this embodiment, when the signal condition is unsatisfied, the remote operation control is terminated regardless of whether or not the unsatisfied state continues for the extension time, if the terminal distance specified based on the terminal signal that lastly satisfied the signal condition is longer than a predetermined threshold distance ("No" at step 1315). Therefore, a possibility that the remote operation control is performed when the first terminal is located outside the permissible range is further decreased.

Notably, in the above description, in order to facilitate understanding of the present disclosure, the constituent elements or the like of the disclosure corresponding to those of the embodiments of the disclosure which will be described later are accompanied by parenthesized names and/or symbols which are used in the embodiments. However, the constituent elements of the disclosure should not be limited to those in the embodiments defined by the names and/or the symbols.

DETAILED DESCRIPTION

Configuration

Figure 1:
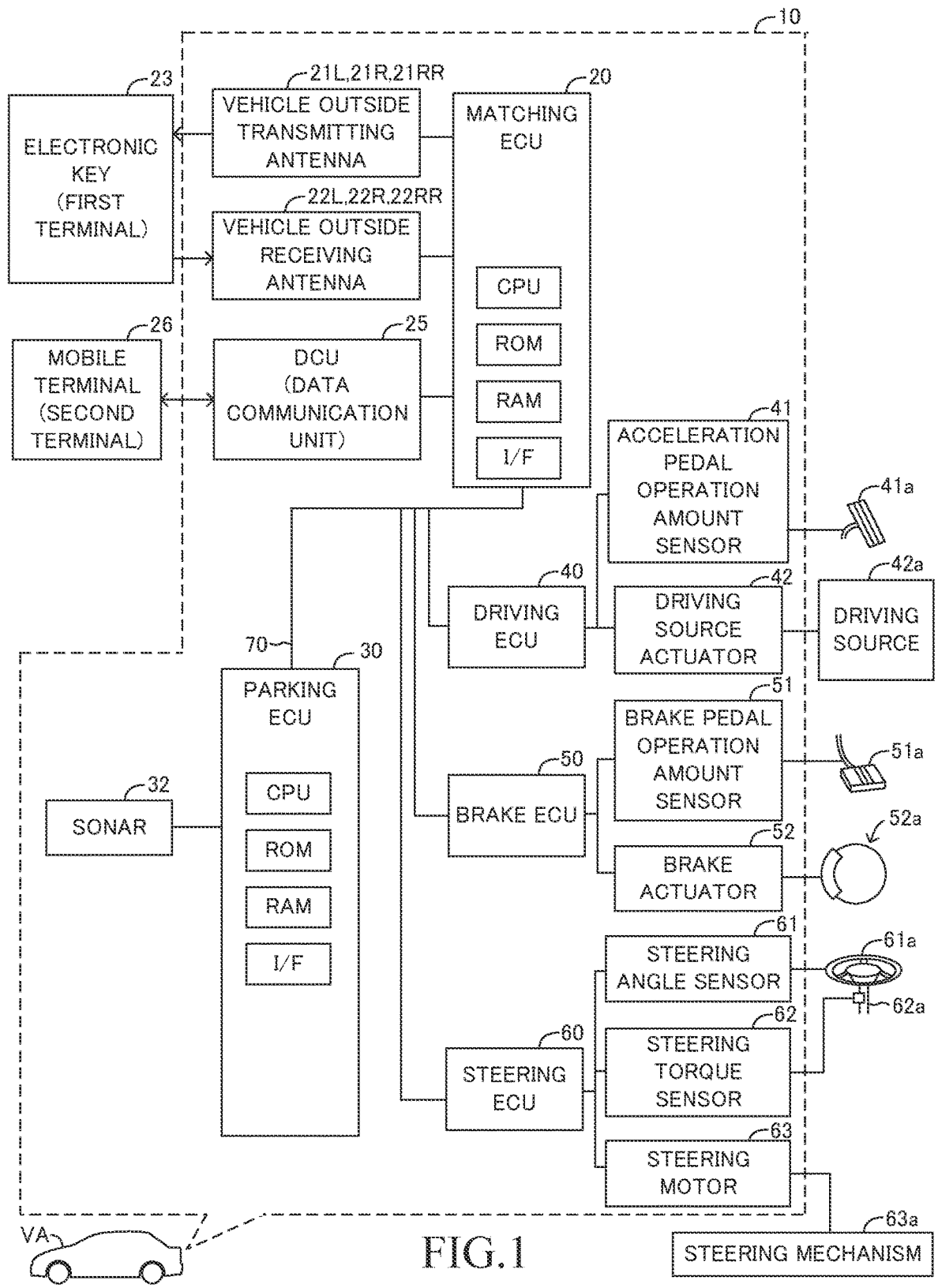
FIG. 1 is a schematic diagram of a vehicle control apparatus according to an embodiment of the present disclosure.

As shown in FIG. 1, a vehicle control apparatus (hereinafter, referred to as a "present control apparatus") 10 according to an embodiment of the present disclosure is applied to (or installed in) a vehicle VA. The present control apparatus 10 comprises a matching ECU 20, a parking ECU 30, a driving ECU 40, a brake ECU 50, and a steering ECU 60. These ECUs are communicably connected with each other so as to be able to mutually exchange data through a CAN (Controller Area Network).

An "ECU" is an abbreviation of an "Electronic Control Unit" that includes a microcomputer as a main component. The microcomputer includes a CPU, a ROM, a RAM, and an interface (I/F). The ECU may sometimes be referred to as a "control unit" or a "controller". The CPU is configured or programmed to realize various functions by executing instructions (routines) stored in a memory (the ROM). Some or all of the ECUs 20, 30, 40, 50, and 60 may be integrated into a single ECU.

The present control apparatus 10 comprises a plurality of vehicle outside transmitting antennas 21 (21L, 21R, and 21RR), a plurality of vehicle outside receiving antennas 22 (22L, 22R, and 22RR), and a data communication unit (hereinafter, referred to as a "DCU") 23. They are connected to the matching ECU 20.

Each of the vehicle outside transmitting antennas 21 is an antenna that transmits a predetermined radio/wireless signal (e.g., a request signal) toward outside of the vehicle VA. Each of the vehicle outside receiving antennas 22 is an antenna that receives a radio/wireless signal (e.g., a response signal) transmitted from a device located outside of the vehicle VA. Hereinafter, each of the vehicle outside receiving antennas 20 may sometimes referred to as a "radio receiver (wireless signal receiver)".

Figure 2:
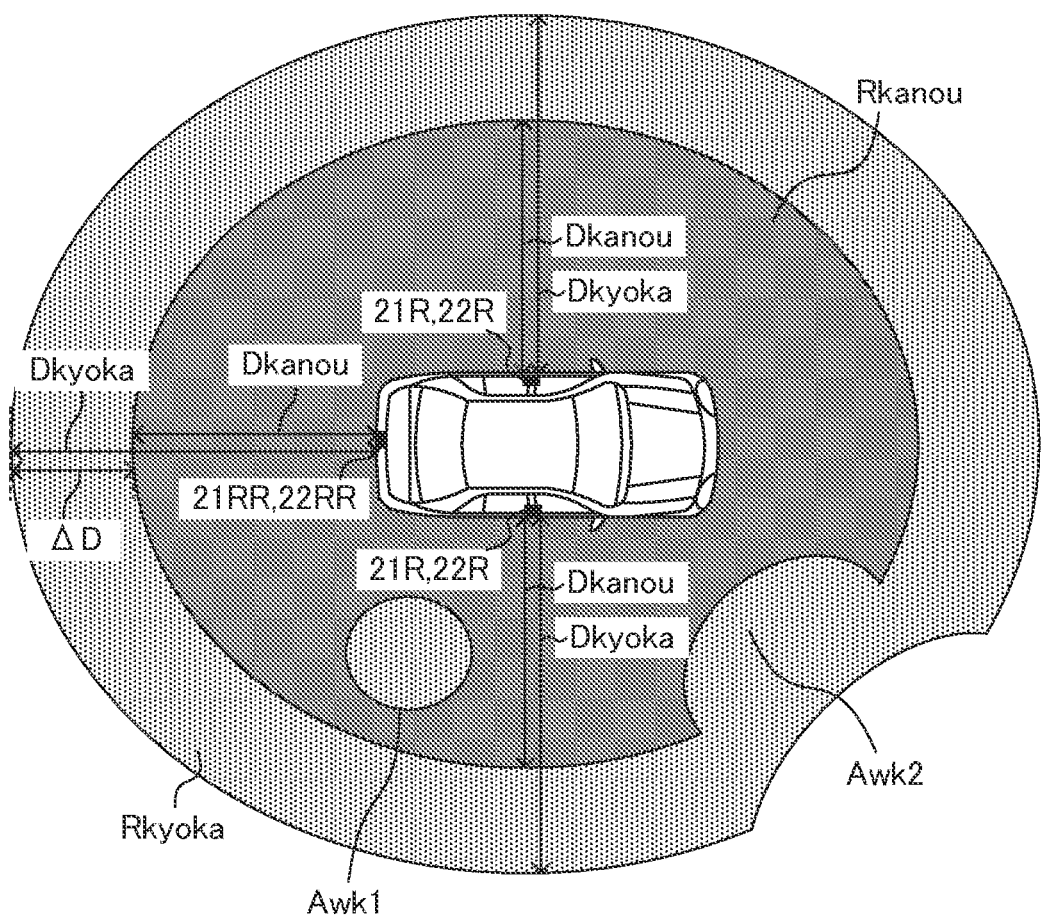
FIG. 2 is a drawing for illustrating a permissible range and a receivable range.

As shown in FIG. 2, the vehicle outside transmitting antenna 21L and the vehicle outside receiving antenna 22L are arranged at a left side of the vehicle VA. The vehicle outside transmitting antenna 21R and the vehicle outside receiving antenna 22R are arranged at a right side of the vehicle VA. The vehicle outside transmitting antenna 21RR and the vehicle outside receiving antenna 22RR are arranged at a rear end of the vehicle VA. Hereinafter, when the vehicle outside transmitting antennas 21L, 21R, and 21RR need not to be distinguished from each other, each of them is referred to as the "vehicle outside transmitting antenna 21". When the vehicle outside receiving antennas 22L, 22R, and 22RR need not to be distinguished from each other, each of them is referred to as the "vehicle outside receiving antenna 22".

An electronic key 23 is a key carried by a driver (user) of the vehicle VA, and is used to lock/unlock unillustrated doors of the vehicle VA. Hereinafter, the electronic key 23 may sometimes be referred to as a "first terminal". The electronic key 23 is configured to be radio communicably (wirelessly) connected with the present control apparatus 10. When the electronic key 23 receives the request signal from the vehicle VA, the electronic key 23 transmits the response signal including a key ID that is an identification assigned to the electronic key 23 through radio communication. In a case where the electronic key 23 is located outside the vehicle, the electronic key 23 receives the request signal transmitted from the vehicle outside transmitting antenna 21 when the electronic key 23 is within a transmitting range of a radio signal of the vehicle outside transmitting antenna 21. The vehicle outside receiving antenna 22 receives the response signal (hereinafter, sometimes referred to as a "terminal signal") transmitted from the electronic key 23.

The matching ECU 20 is configured to transmit the above-described request signal to the outside of the vehicle through the vehicle outside transmitting antenna 21. In addition, the matching ECU 20 is configured to be able to receive the response signal from the electronic key 23 (through the vehicle outside receiving antenna 22). When the vehicle outside receiving antenna 22 receives the response signal from the electronic key 23, the matching ECU 20 determines whether or not the key ID included in the received response signal coincides with (or matches) a vehicle unique ID that is an identifier assigned to the vehicle VA. Namely, the matching ECU 20 conducts a key matching. The matching ECU 20 sends the result of the key matching to the parking ECU 30 through the CAN 70.

The DCU 25 is configured to be able to establish a radio signal connection with a mobile terminal (e.g., a smart phone, a tablet, or the like) 26 that is a communication terminal carried by the user. The mobile terminal may sometimes be referred to as a "second terminal". The DCU 25 exchanges data with the mobile terminal 26 through a well-known Near Field Communication (e.g., Bluetooth (Trademark)).

The present control apparatus 10 comprises a plurality of sonars 32. The sonars 32 are connected to the parking ECU 30.

A plurality of the sonars 32 includes a front sonar, a rear sonar, a left sonar, and a right sonar. The front sonar, the rear sonar, the left sonar, and the right sonar transmit (emit) sonic wave to a frontward area of the vehicle VA, a rearward area of the vehicle VA, a leftward area of the vehicle VA, and a rightward area of the vehicle VA, respectively. Each of them receives reflected sonic wave generated by an object. Each of them sends information (namely, sonar data) regarding the emitted sonic wave and the received sonic wave to the parking ECU 30, every time a predetermined time elapses.

The driving ECU 40 is connected with an acceleration pedal operation amount sensor 41 and a driving source actuator 42.

The acceleration pedal operation amount sensor 41 is configured to detect an acceleration pedal operation amount AP that is an operation amount of an acceleration pedal 41a, and to generate a signal indicative of the acceleration pedal operation amount AP. The driving ECU 40 obtains the acceleration pedal operation amount AP based on the signal generated by the acceleration pedal operation amount sensor 41.

The driving source actuator 42 is connected with a driving source (a motor, an internal combustion engine, and the like) 42a that generates a driving force applied to the vehicle VA. The driving ECU 40 controls the driving source actuator 42 so as to change a driving state of the driving source 42a. Therefore, the driving ECU 40 can adjust the driving force applied to the vehicle VA. The driving ECU 40 drives the driving source actuator 42 in such a manner that the driving force applied to the vehicle VA becomes greater as the acceleration pedal operation amount AP becomes greater.

The brake ECU 50 is connected with a brake pedal operation amount sensor 51, and a brake actuator 52.

The brake pedal operation amount sensor 51 is configured to detect a brake pedal operation amount BP that is an operation amount of a brake pedal 51a, and to generate a signal indicative of the brake pedal operation amount BP. The brake ECU 50 obtains the brake pedal operation amount BP based on the signal generated by the brake pedal operation amount sensor 51.

The brake actuator 52 is connected with a well-known hydraulic brake device 52a. The brake ECU 50 controls the brake actuator 52 so as to change a frictional brake force that the brake device 52a generates. Therefore, the brake ECU 50 can adjust a brake force applied to the vehicle VA. The brake ECU 50 drives the brake actuator 52 in such a manner that the brake force applied to the vehicle VA becomes greater as the brake pedal operation amount BP becomes greater.

The steering ECU 60 is connected with a steering angle sensor 61, a steering torque sensor 62, and a steering motor 63.

The steering angle sensor 61 is configured to detect, as a steering angle θs, a rotating angle of the steering wheel 61a from a neutral position so as to generate a signal indicative of the steering angle θs. The steering ECU 60 obtains the steering angle θs based on the signal generated by the steering angle sensor 61.

The steering torque sensor 62 is configured to detect a steering torque Tr acting on a steering shaft 62a connected to the steering wheel 61a so as to generate a signal indicative of the steering torque Tr. The steering ECU 60 obtains the steering torque Tr based on the signal generated by the steering torque sensor 62.

The steering motor 63 generates a torque. The steering motor 63 is incorporated into and is capable of transmitting the torque to "a steering mechanism 63a including the steering wheel 61a, the steering shaft 62a, and a steering gear mechanism". The steering motor 63 generates the torque in accordance with "an electric power supplied from an unillustrated battery of the vehicle VA" whose magnitude and direction are controlled by the steering ECU 60. The torque generates a steering assist torque, or a torque to steer a right steered wheel and a left steered wheel.

The steering ECU 60 is configured to let the steering motor 63 generate the steering assist torque in accordance with the steering torque Tr. In addition, when the steering ECU 60 receives "a steering instruction including a target steering angle" sent from the parking ECU 30, the steering EUC 60 controls the steering motor 63 in such a manner that the steering angle θs becomes equal to the "target steering angle included in the received steering instruction" so as to automatically steer the steered wheels.

Outline of Operation

The present control apparatus 10 performs a control (hereinafter, referred to as a "remote operation control") to move the vehicle VA in accordance with an operation (hereinafter, referred to as a "remote operation") to the mobile terminal 26 (performed) by the user located outside the vehicle.

The remote operation control is designed to be prohibited when the user is located outside a permissible range Rkyoka (refer to FIG. 2) that is a range within a predetermined permissible distance Dkyoka from the vehicle VA.

This is because, when the user is located outside the permissible range Rkyoka, the user cannot visually confirm (or look at) a surrounding of the vehicle VA, and a possibility that someone gets in the vehicle VA that is under the remote operation and steals the vehicle VA is high.

The outside receiving antennas 22 can receive the response signal transmitted from the electronic key 23 that is located within a predetermined distance that is referred to as a receivable distance Dkanou. In the present embodiment, the receivable distance Dkanou is shorter than the permissible distance Dkyoka. In other words, the receivable range Rkanou whose radius is equal to the receivable distance is smaller/narrower than the permissible range Rkyoka whose radius is equal to the permissible distance. The present control apparatus 10 determines that a "permissible condition that the user is located within the permissible range Rkyoka" is satisfied, and permits an execution of the remote operation control, when a signal condition including a condition that the outside receiving antennas 22 successfully receives the response signal is satisfied.

The receivable range Rkanou may includes a "weak signal strength area Awk (refer to FIG. 2)" in which signal strength is weak, depending on a surrounding environment. When the electronic key 23 is located within the weak signal strength area Awk, there is a possibility that the outside receiving antennas 22 cannot receive the response signal even when the electronic key 23 is located within the permissible range Rkyoka. When this happens, the conventional apparatus stops the remote operation control that has been being executed.

To cope with the above-described problem, the present control apparatus 10 determines that the permissible condition is satisfied so as to continue performing the remote operation control without stopping the execution of the remote operation control, if a state where the outside receiving antennas 22 does not receive the response signal (i.e., unsatisfied state in which the signal condition is not satisfied) does not continue for a predetermined extension time Text. Whereas, when the unsatisfied state continues for the extension time Text, the present control apparatus 10 determines that the permissible condition is not satisfied so as to stop executing the remote operation control and perform a deceleration control to stop the vehicle VA.

The thus configured present control apparatus 10 can continue the remote operation control without stopping it, even when the electronic key 23 is temporally located within the weak signal strength area Awk in the receivable range Rkanou, and therefore, the vehicle outside receiving antennas 22 cannot receive the response signal temporally. Accordingly, the present control apparatus can prevent the user from having a feeling of strangeness.

In addition, the present control apparatus 10 still continues the remote operation control without stopping it until a time point at which the unsatisfied state continues for the extension period Text from a time point at which a position of the electronic key 23 changes from the inside of the receivable range Rkanou to the outside of the receivable range Rkanou, and therefore, a state where the vehicle outside receiving antennas 22 cannot receive the response signal occurs. This allows the user to continue using the remote operation control even after the user moves out of the receivable range Rkanou.

Figure 3:
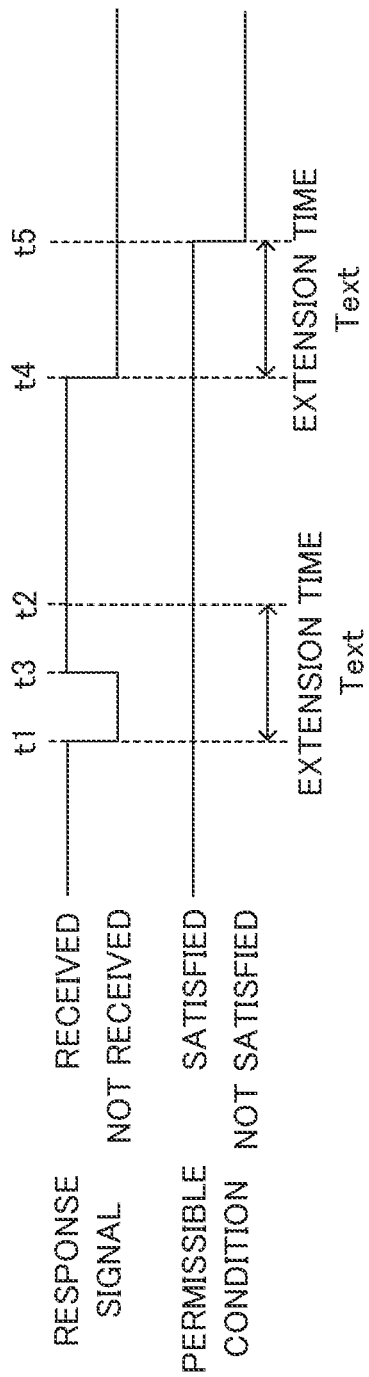
FIG. 3 is a time chart for describing an outline of operation of a present disclosure apparatus.

For example, as in an example shown in FIG. 3, the vehicle outside receiving antennas 22 continues receiving the response signal before a time point t1. Therefore, the present control apparatus 10 determines that the signal condition is satisfied, and continues executing the remote operation control before the time point t1. The vehicle outside receiving antennas 22 no longer receives the response signal at and after the time point t1, and therefore, a state (hereinafter, referred to as a "signal-condition-state") regarding the signal condition changes from a satisfied-state where the signal condition is satisfied to an unsatisfied-state where the signal condition is not satisfied at the time point t1. In a period from the time point t1 to a time point at which the extension time Text elapses from the time point t1, the present control apparatus 10 determines that the permissible condition is satisfied even though the vehicle outside receiving antennas 22 does not receive the response signal, and thus, continues executing the remote operation control. In the example shown in FIG. 4, since the vehicle outside receiving antennas 22 starts (restarts) receiving the response signal again at a time point t3 before the time point t2, the signal-condition-state changes from the unsatisfied-state to the satisfied-state at the time point t3. Accordingly, since the unsatisfied-state does not continue for the extension time Text, the present control apparatus 10 continues determining that the permissible condition is satisfied so that the present control apparatus 10 continues executing the remote operation control.

After a time point t4, the vehicle outside receiving antennas 22 does not receive the response signal. In a time period from the time point t4 to a time point t5 at which the extension time Text elapses from the time point t4, the unsatisfied-state remains for the extension time Text. Therefore, the present control apparatus 10 determines that the permissible condition becomes unsatisfied at the time point t5, so that the present control apparatus 10 stops executing the remote operation control at the time point t5.

Example of Operations

Figure 4:
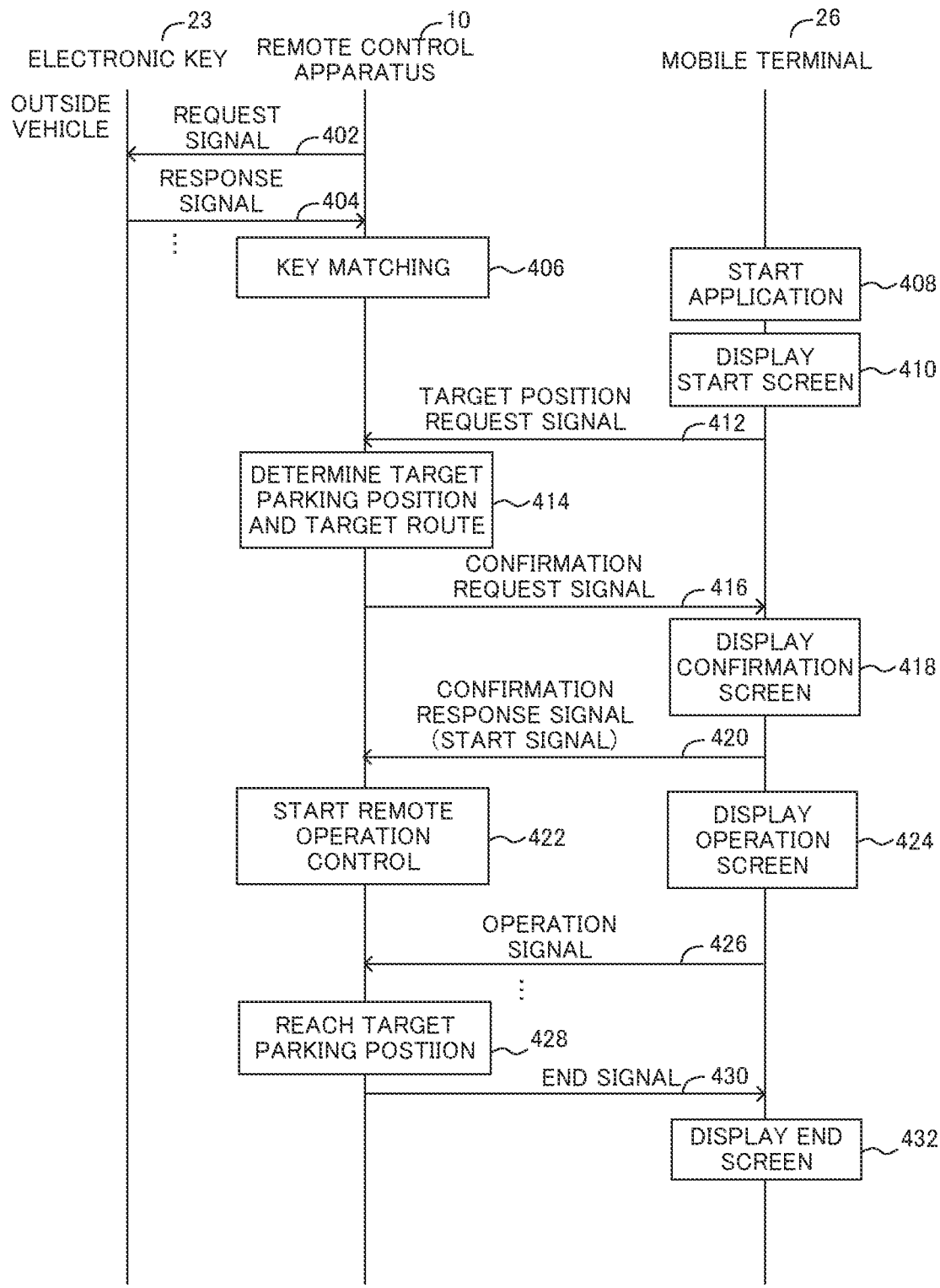
FIG. 4 is a drawing showing a sequence of a vehicle control apparatus and a mobile terminal.

Operations of the present control apparatus 10, the electronic key 23, and the mobile terminal 26 will next be specifically described with reference to FIG. 4.

The present control apparatus 10 transmits the request signal from the vehicle outside receiving antennas 22 every time a predetermined time elapses (step 402). The electronic key 23 transmits the response signal including the key ID upon receiving the request signal (step 404).

The present control apparatus 10 conduct the key matching for determining whether or not the key ID matches (coincides with) the vehicle unique ID (step 406).

The present control apparatus 10 determines that the signal condition becomes satisfied when the key ID matches (coincides with) the vehicle unique ID (namely, when the key matching is successful). Whereas, the present control apparatus 10 determines that the signal condition is not satisfied when the key ID does not match (coincide with) the vehicle unique ID (namely, when the key matching is not successful).

The signal condition in the present embodiment is a condition that is satisfied when a first condition and a second condition are both satisfied. The first condition is a condition that the present control apparatus 10 has received the response signal. The second condition is a condition that key matching is successful.

The user starts a remote operation control application by operating the mobile terminal 26 (step 408). When and after the remote operation control application is started, the mobile terminal 26 displays a start screen 500 shown in FIG. 5A on a display 270 (refer to FIGS. 5A to 5C) (step 410). It should be noted that the display 270 is a touch panel type display device.

Figure 5A:
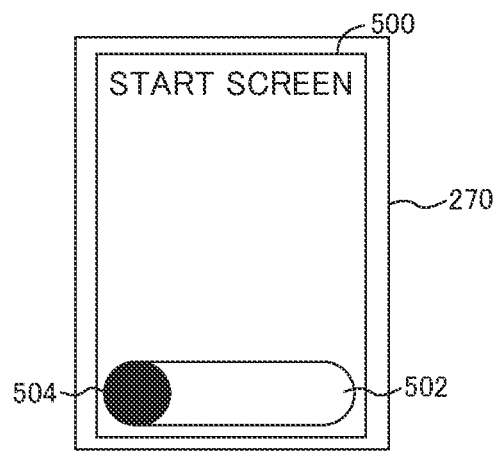
FIG. 5A is drawing showing a start screen displayed on the mobile terminal.

As shown in FIG. 5A, the start screen 500 includes a sliding operation area 502. When the start screen 500 is at an initial stage, an operation displayed element 504 is positioned at a left end of the sliding operation area 502. When the user slides the operation displayed element 504 toward a right end of the sliding operation area 502, the mobile terminal 26 transmits a target position request signal to the DCU 25 (step 412).

When the present control apparatus 10 receives the target position request signal, the present control apparatus 10 determines a target parking position and a target route (target path), based on the sonar data (step 414). The target parking position is a target position of the vehicle VA used in the remote operation control. When the vehicle reaches the target parking position, the vehicle speed Vs is made equal to zero. The target route is a path along which a center between a rear left wheel and a rear right is made to travel by the remote operation control.

Thereafter, the present control apparatus 10 transmits a confirmation request signal to the mobile terminal 26 (step 416). The confirmation request signal includes image data concerning a confirmation screen. The confirmation screen is a screen for displaying a positional relationship between the vehicle VA and the target parking position and a positional relationship between the vehicle VA and the target route.

Figure 5B:
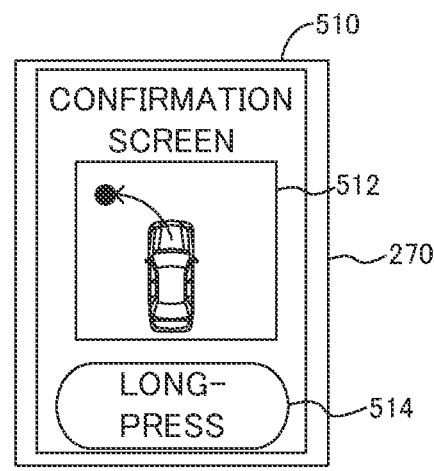
FIG. 5B is drawing showing a confirmation screen displayed on the mobile terminal.

When the mobile terminal 26 receives the confirmation request signal, the mobile terminal 26 displays a confirmation screen 510 shown in FIG. 5B on the display 270. As shown in FIG. 5B, the confirmation screen 510 includes a parking position display area 512 and a long-press button 514. The above-described confirmation screen is displayed in the parking position display area 512. When the user look at the confirmation screen displayed in the parking position display area 512, and agrees with the target parking position and the target route, the user touches the long-press button 514. When the long-press button 514 is touched for a predetermined time or longer, the mobile terminal 26 determines that a predetermined start operation is performed, and transmits a confirmation response signal (start signal) to the DCU 25 (step 420).

Figure 5C:
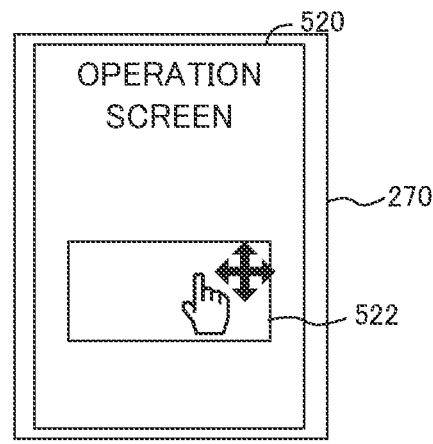
FIG. 5C is drawing showing an operation screen displayed on the mobile terminal.

When the DCU 25 receives the confirmation response signal (start signal), the present control apparatus 10 determines that a predetermined start condition is satisfied so as to start the remote operation control (step 422). When the start operation is performed on the confirmation screen 510, the mobile terminal 26 displays an operation screen 520 (refer to FIG. 5C) on the display 270 (step 424). As shown in FIG. 5C, the operation screen 520 includes an operation area 522. While the user is performing an operation to change a position of touch on the operation area 522 (in other words, while the user is performing the remote control), the mobile terminal 26 continues transmitting the operation signal to the DCU 25 (step 426) every time a predetermined time elapses.

Once the present control apparatus 10 starts the remote operation control, the present control apparatus 10 continues causing the vehicle to move/travel along the target route till the vehicle reaches the target parking position as long as the permissible condition is satisfied so that the present control apparatus 10 continues receiving the the operation signal. When the vehicle VA reaches a deceleration start position that is a position located a predetermined distance away from the target parking position before the target parking position along the target route, the control apparatus 10 starts decelerating the vehicle VA so as to stop the vehicle at the target parking position.

It should be noted that, when a state in which the signal condition is not satisfied continues for the extension time Text, the control apparatus 10 determines that the permissible condition becomes unsatisfied and stops the vehicle VA by performing a deceleration control to decelerate the vehicle VA (i.e., stops the remote operation control).

When the present control apparatus 10 determines that the vehicle VA has reached the target parking position (step 428), the present control apparatus 10 transmits an end signal to the mobile terminal 26 (step 430). When the mobile terminal 26 receives the end signal, the mobile terminal 26 displays an unillustrated end screen on the display 270. When an unillustrated OK button on the end screen is touched, the mobile terminal 26 ends/terminates the remote operation control application.

Specific Operation

<Response Signal Receiving Routine>

The CPU (hereinafter, referred to as a "first CPU" unless otherwise specified) of the matching ECU 20 is configured or programmed to execute a response signal receiving routine shown by a flowchart in FIG. 6 every time a predetermined time elapses.

Figure 6:
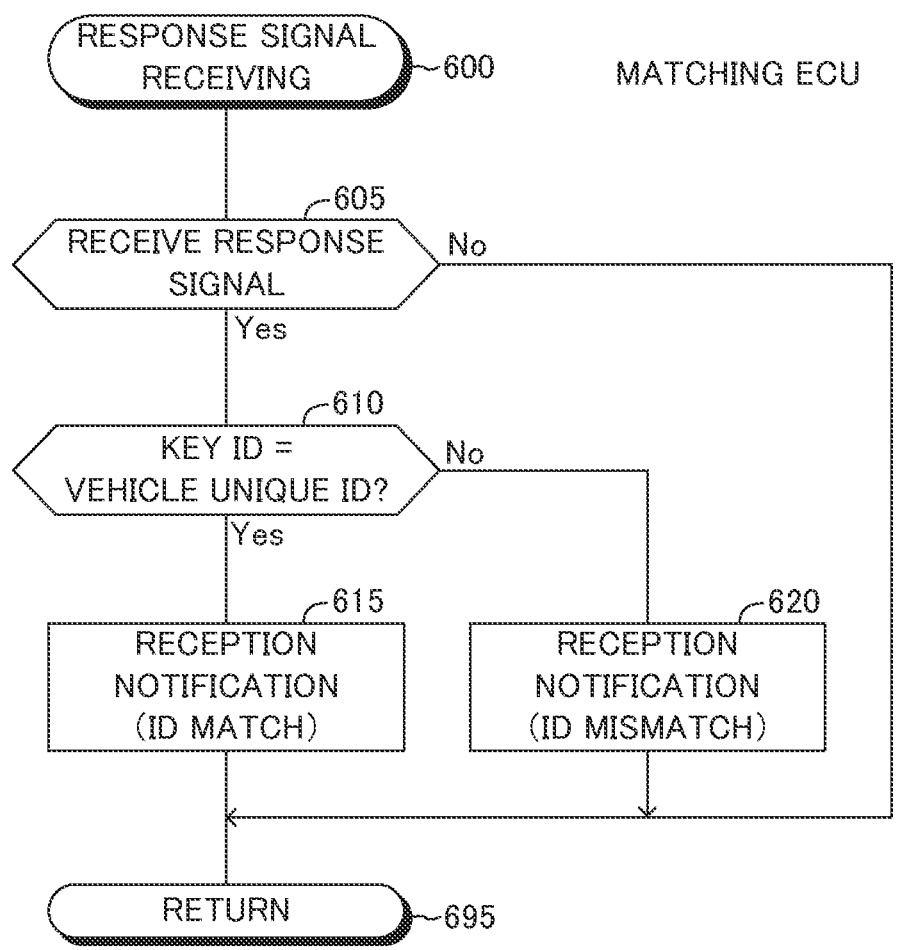
FIG. 6 is a flowchart illustrating a response signal receiving routine executed by a CPU of a matching ECU.

When an appropriate time point comes, the first CPU starts processing from step 600 in FIG. 6, and proceeds to step 605. At step 605, the first CPU determines whether or not the response signal from the electronic key 23 has been received in a period from a time point at which the present routine was executed last time to a present time point.

When the response signal has been received in the above-described period, the first CPU makes a "Yes" determination at step 605, and proceeds step 610. At step 610, the first CPU determines whether or not the key ID coincides with (matches) the vehicle unique ID.

When the key ID coincides with (matches) the vehicle unique ID, first CPU makes a "Yes" determination at step 610, and proceeds to step 615. At step 615, the first CPU transmits a reception notification including ID match information to the parking ECU 30. The ID match information indicates that the key ID coincides with the vehicle unique ID. Thereafter, the first CPU proceeds to step 695 to terminate the present routine tentatively.

Whereas, when the key ID does not coincide with (match) the vehicle unique ID, first CPU makes a "No" determination at step 610, and proceeds to step 620. At step 620, the first CPU transmits a reception notification including ID mismatch information to the parking ECU 30. The ID mismatch information indicates that the key ID does not coincide with the vehicle unique ID. Thereafter, the first CPU proceeds to step 695 to terminate the present routine tentatively.

If the response signal has not been received in the above-described period when the first CPU proceeds to step 605, the first CPU makes a "No" determination at step 605, and proceeds step 695 to terminate the present routine tentatively.

<Permissible Condition Determination Routine>

The CPU (hereinafter, referred to as a "second CPU" unless otherwise specified) of the parking ECU 30 is configured or programmed to execute a permissible condition determination routine shown by a flowchart in FIG. 7 every time a predetermined time elapses.

Figure 7:
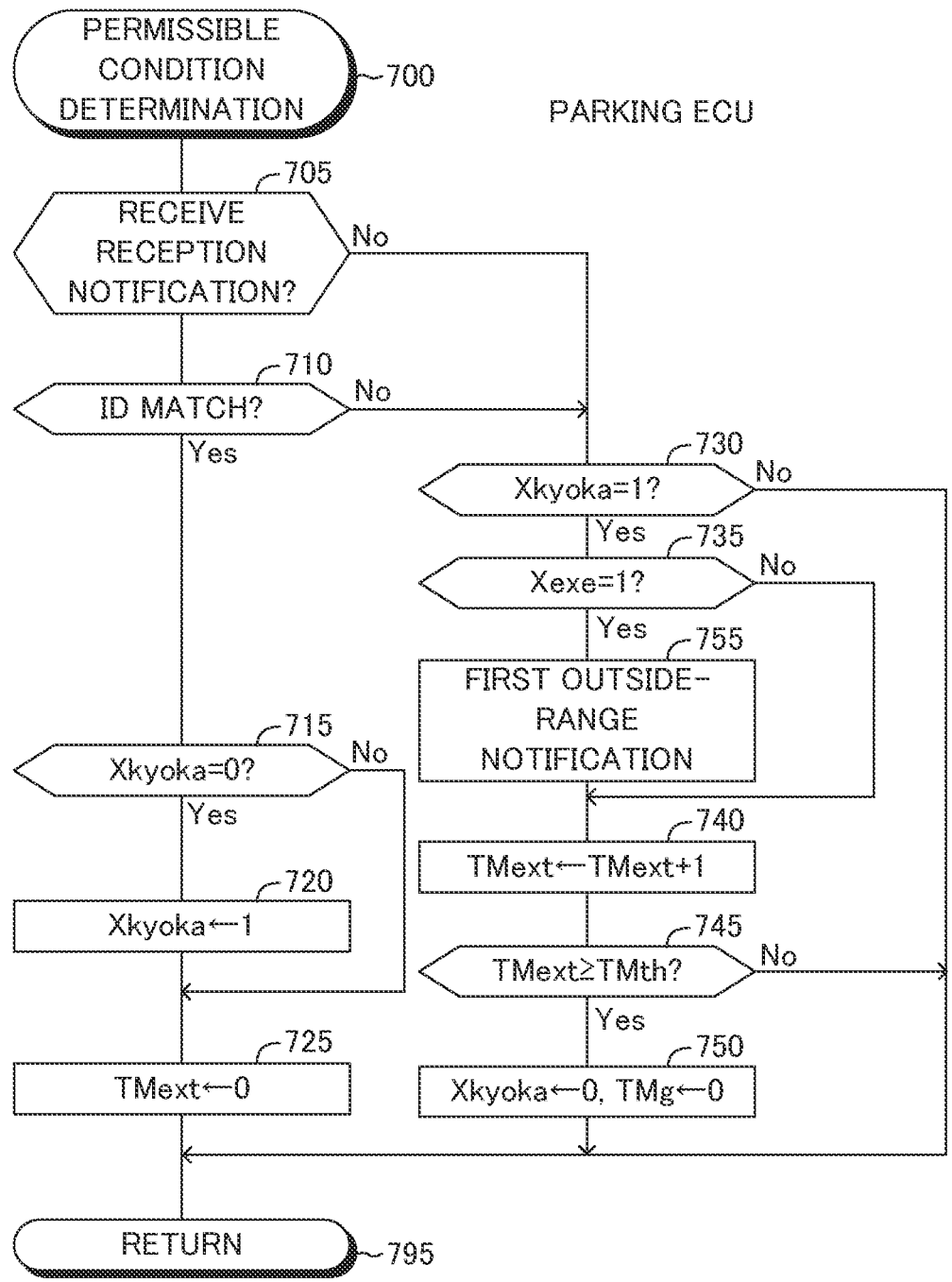
FIG. 7 is a flowchart illustrating a permissible condition determining routine executed by a CPU of a parking ECU.

When an appropriate time point comes, the second CPU starts processing from step 700 in FIG. 7, and proceeds to step 705. At step 705, the second CPU determines whether or not the reception notification rom the matching ECU 20 has been received in a period from a time point at which the present routine was executed last time to a present time point.

When the reception notification has been received in the above-described period, the second CPU makes a "Yes" determination at step 705, and proceeds step 710. At step 710, the second CPU determines whether or not the ID match information is included in the received reception notification.

When the ID match information is included in the reception notification, the second CPU determines that the signal condition is satisfied. In this case, the second CPU makes a "Yes" determination at step 710, and proceeds to step 715. At step 715, the second CPU determines whether or not a value of a permissible flag Xkyoka is "0".

The value of the permissible flag Xkyoka is set to "0" when the permissible condition is not satisfied, and is set to "1" when the permissible condition is satisfied. It should be noted that the value of the permissible flag Xkyoka is set to "0" in an initialization routine. The initialization routine is executed by the second CPU when a position of an unillustrated ignition key switch of the vehicle VA is switched from an off position to an on position.

When the value of the value of the permissible flag Xkyoka is "0", the second CPU makes a "Yes" determination at step 715, and sequentially executes the processes of step 720 and step 725.

Step 720: the second CPU sets the value of the value of the permissible flag Xkyoka to "1".

Step 725: the second CPU sets a value of an extension timer TMext to "0".

The extension timer TMext is a timer for counting (measuring) a "time of a state in which the unsatisfied-state continues", in a period in which the permissible condition is satisfied.

After the second CPU executes the process of step 725, the second CPU proceeds to step 795 to terminate the present routine tentatively.

If the value of the value of the permissible flag Xkyoka is "1" when the second CPU proceeds to step 715, the second CPU makes a "No" determination at step 715, and executes the process of step 725. Thereafter, the second CPU proceeds to step 795 to terminate the present routine tentatively.

If the reception notification has not been received when the second CPU proceeds to step 705, the vehicle outside receiving antennas 22 has not received the response signal, and thus, the signal condition is not satisfied. In this case, the second CPU makes a "No" determination at step 705, and proceeds step 730. At step 730, the second CPU determines whether or not the value of the permissible flag Xkyoka is "1".

When the value of the permissible flag Xkyoka is "1", the second CPU makes a "Yes" determination at step 730, and proceeds to step 735. At step 735, the second CPU determines whether or not a value of an execution flag Xexe is "1".

The value of the execution flag Xexe is set to "1", when the start condition of the remote operation control becomes satisfied.

The value of the execution flag Xexe is set to "0", when the end condition of the remote operation control becomes satisfied.

When the value of the execution flag Xexe is "0", the second CPU makes a "No" determination at step 735, and sequentially executes the processes of step 740 to step 745.

Step 740: the second CPU increments the value of the extension timer TMext by "1".

Step 745: the second CPU determines whether or not the value of the extension timer TMext is equal to or greater than a threshold TMth.

When the extension timer TMext reaches the threshold TMth, the unsatisfied-state continues for the extension time Text.

When the extension timer TMext is smaller than the threshold TMth (namely, when the unsatisfied-state has not continued for the extension time Text), the second CPU makes a "No" determination at step 745, and proceeds to step 795 to terminate the present routine tentatively.

Whereas, when the extension timer TMext is equal to or greater than the threshold TMth (namely, when the unsatisfied-state has continued for the extension time Text), the second CPU makes a "Yes" determination at step 745, and proceeds to step 750. At step 750, the second CPU sets the value of the permissible flag Xkyoka to "0", sets a value of an outside-range timer TMg to "0", and proceeds to step 795 to terminate the present routine tentatively.

The outside-range timer TMg is a timer for counting (measuring) an "elapsed time from a time point at which the permissible condition becomes unsatisfied.

If the value of the execution flag Xexe is "0" when the second CPU proceeds to step 735, the second CPU makes a "Yes" determination at step 735, and proceeds to step 755. At step 755, the second CPU transmits a first outside-range notification instruction from the DCU 25 to the mobile terminal 26. Thereafter, the second CPU executes processes of steps following step 740. When the mobile terminal 26 receives the first outside-range notification instruction, the mobile terminal 26 displays a message saying "Please approach the vehicle." on the display 270.

If the value of the permissible flag Xkyoka is "0" when the second CPU proceeds to step 730, the second CPU makes a "No" determination at step 730, and proceeds to step 795 to terminate the present routine tentatively.

If the ID match information is not included in the reception notification (namely, if the ID mismatch information is included in the reception notification) when the second CPU proceeds to step 710, the second CPU determines that the signal condition is not satisfied. In this case, the second CPU makes a "No" determination at step 710, and proceeds to step 730.

<Start Condition Determining Routine>

Figure 8:
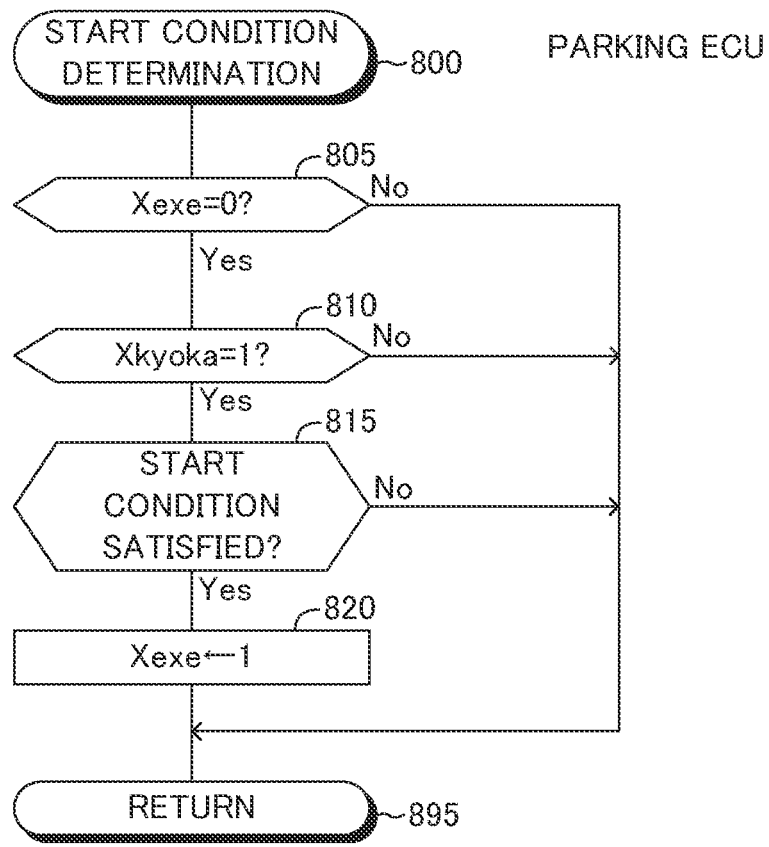
FIG. 8 is a flowchart illustrating a start condition determining routine executed by the CPU of the parking ECU.

The second CPU is configured or programmed to execute a start condition determining routine shown by a flowchart in FIG. 8 every time a predetermined time elapses.

When an appropriate time point comes, the second CPU starts processing from step 800 in FIG. 8, and proceeds to step 805. At step 805, the second CPU determines whether or not the value of the execution flag Xexe is "0".

When the value of the execution flag Xexe is "0", the second CPU makes a "Yes" determination at step 805 and proceeds to step 810. At step 810, the second CPU determines whether or not the value of the permissible flag Xkyoka is "1". When the value of the permissible flag Xkyoka is "0", the second CPU makes a "No" determination at step 810, and proceeds to step 895 to terminate the present routine tentatively.

When the value of the execution flag Xexe is "1", the second CPU makes a "Yes" determination at step 810 and proceeds to step 815. At step 815, the second CPU determines whether or not the start condition that the DCU 25 has received the confirmation response signal is satisfied.

When the start condition is not satisfied, the second CPU makes a "No" determination at step 815, and proceeds to step 895 to terminate the present routine tentatively. Whereas, when the start condition is satisfied, the second CPU makes a "Yes" determination at step 815, and proceeds to step 820. At step 820, the second CPU sets the value of the execution flag Xexe to "1". Thereafter, the second CPU proceeds to step 895 to terminate the present routine tentatively.

If the value of the execution flag Xexe is "1" when the second CPU proceeds to step 805, the second CPU makes a "No" determination at step 805, and proceeds to step 895 to terminate the present routine tentatively.

<Remote Operation Control Routine>

Figure 9:
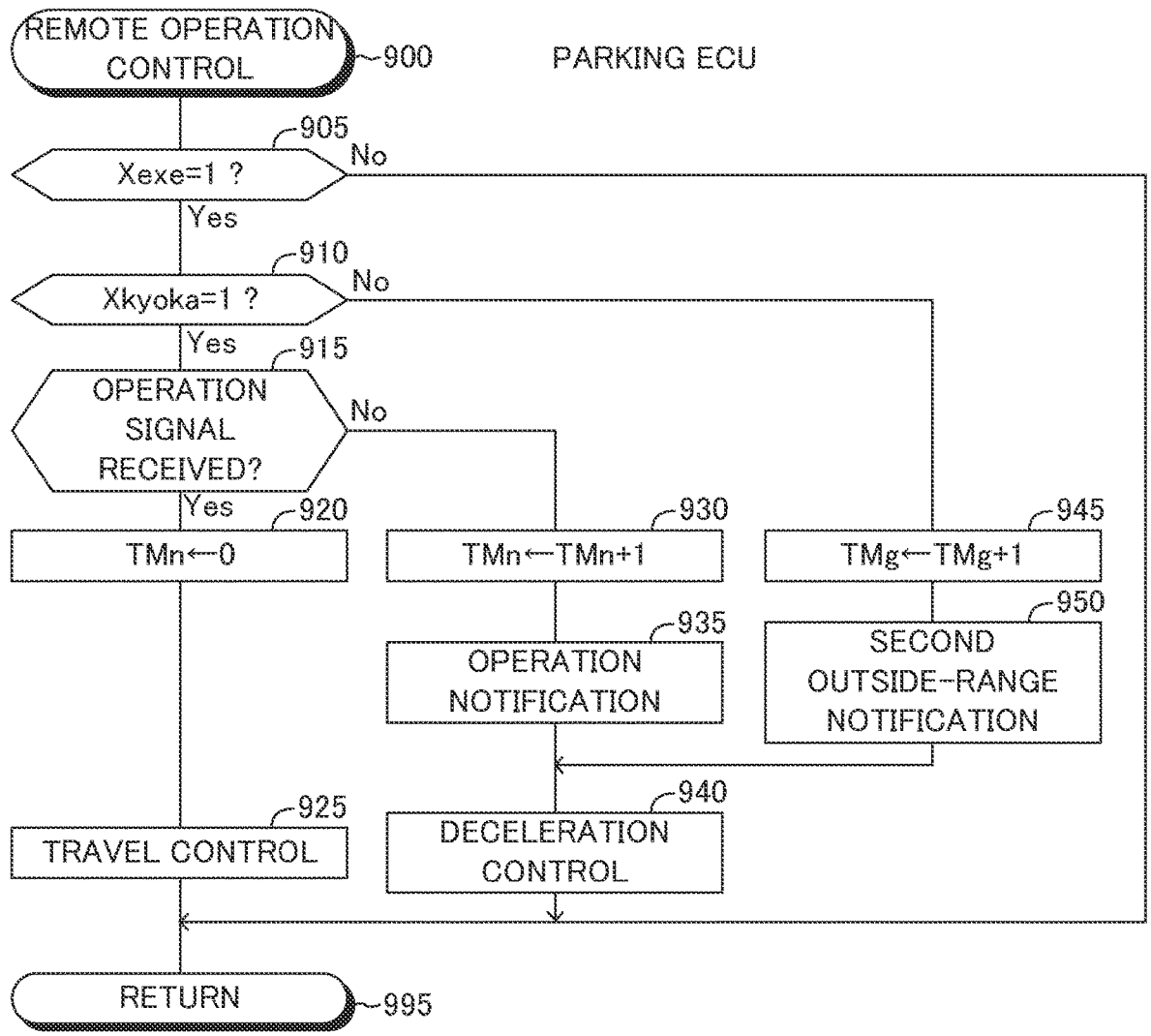
FIG. 9 is a flowchart illustrating a remote operation control routine executed by the CPU of the parking ECU.

The second CPU is configured or programmed to execute a remote operation control routine shown by a flowchart in FIG. 9 every time a predetermined time elapses.

When an appropriate time point comes, the second CPU starts processing from step 900 in FIG. 9, and proceeds to step 905. At step 905, the second CPU determines whether or not the value of the execution flag Xexe is "1". When the value of the execution flag Xexe is "0", the second CPU makes a "No" determination at step 905, and proceeds to step 995 to terminate the present routine tentatively.

When the value of the execution flag Xexe is "1", the second CPU makes a "Yes" determination at step 905, and proceeds to step 910. At step 910, the second CPU determines whether or not the value of the permissible flag Xkyoka is "1".

When the value of the permissible flag Xkyoka is "1", the second CPU makes a "Yes" determination at step 910, and proceeds to step 915. At step 915, the second CPU determines whether or not the DCU 25 has received the operation signal in a period from a time point at which the present routine was executed last time to a present time point.

When the DCU 25 has received the operation signal in the above-described period, the second CPU makes a "Yes" determination at step 915, and sequentially executes the processes of step 920 and step 925.

Step 920: the second CPU sets a value of non-operation timer TMn to "0". The non-operation timer TMn is a timer for counting (measuring) a "time (hereinafter, referred to as a "non-operation time") of a state in which any operation is not performed to the operation area 522 after the remote operation control was started".

Step 925: the second CPU performs a travel control for causing the vehicle VA to run/travel along the target route at a predetermined control speed Vc.

Thereafter, the second CPU proceeds to step 995 to terminate the present routine tentatively.

The travel control will next be described specifically. The second CPU obtains a vehicle speed Vs indicative of a current speed of the vehicle VA from an unillustrated vehicle speed sensor. The second CPU calculates a target acceleration Gt to cause the vehicle speed Vs to become equal to the above-described target control vehicle speed Vc if the vehicle has not reached the predetermined deceleration start position. The second CPU transmits the target acceleration Gt to the driving ECU 40 and the brake ECU 50.

The deceleration start position is the position located the predetermined distance away from the target parking position before the target parking position along the target route. When the vehicle VA reaches the deceleration start position, the vehicle VA starts to be decelerated at a first deceleration so that the vehicle VA stops when the vehicle VA reaches the target parking position. Therefore, when and after the vehicle VA reaches the deceleration start position, the second CPU transmits the first deceleration as the target acceleration Gt to the driving ECU 40 and the brake ECU 50.

The driving ECU 40 controls the driving source actuator 42 and the brake ECU 50 controls the brake actuator 52, in such a manner that an acceleration G of the vehicle VA coincides with the received target acceleration Gt. It should be noted that the acceleration of the vehicle VA is obtained by differentiating the vehicle Vs with respect to time.

In addition, the second CPU calculates a target steering angle to cause the vehicle VA to travel along the target route, and transmits the target steering angle to the steering ECU 60. The steering ECU 60 controls the steering motor 63 in such a manner that the steering angle θs becomes equal to the target steering angle.

If the DCU 25 has not received the operation signal in the above-described period when the second CPU proceeds to step 915, the second CPU makes a "No" determination at step 915, and sequentially executes the processes of step 930 to step 940.

Step 930: the second CPU increments the value of the non-operation timer TMn by "1".

Step 935: the second CPU transmits an operation notification instruction to the mobile terminal 26 from the DCU 25.

When the mobile terminal 26 receives the operation notification instruction, the mobile terminal 26 displays the following message at an upper part of the operation area 522 in the operation screen displayed on the display 270.

Message: "Tap the operation area with a finger and move the finger. The remote operation control will end shortly."

Step 940: the second CPU performs a deceleration control to cause the vehicle VA to decelerate at a predetermined second deceleration. It is preferable that a magnitude of the second deceleration be smaller than a magnitude of the first deceleration, however, the magnitude of the second deceleration may be equal to the magnitude of the first deceleration.

Thereafter, the second CPU proceeds to step 995 to terminate the present routine tentatively.

If the value of the permissible flag Xkyoka is "0" when the second CPU proceeds to step 910, the unsatisfied state continues for the extension time Text after the start condition became satisfied. In this case, the second CPU makes a "No" determination at step 910, and sequentially executes the processes of step 945 and step 950.

Step 945: the second CPU increments the value of the outside-range timer TMg by "1".

Step 950: the second CPU transmits a second outside-range notification instruction to the mobile terminal 26 from the DCU 25. When the mobile terminal 26 receives the second outside-range notification instruction, the mobile terminal 26 displays the following message on the display 270.

Message: "Approach the vehicle. The remote operation control will end shortly."

Thereafter, the second CPU proceeds to step 940 to perform the above-described deceleration control, and proceeds to step 995 to terminate the present routine tentatively.

<End Condition Determining Routine>

Figure 10:
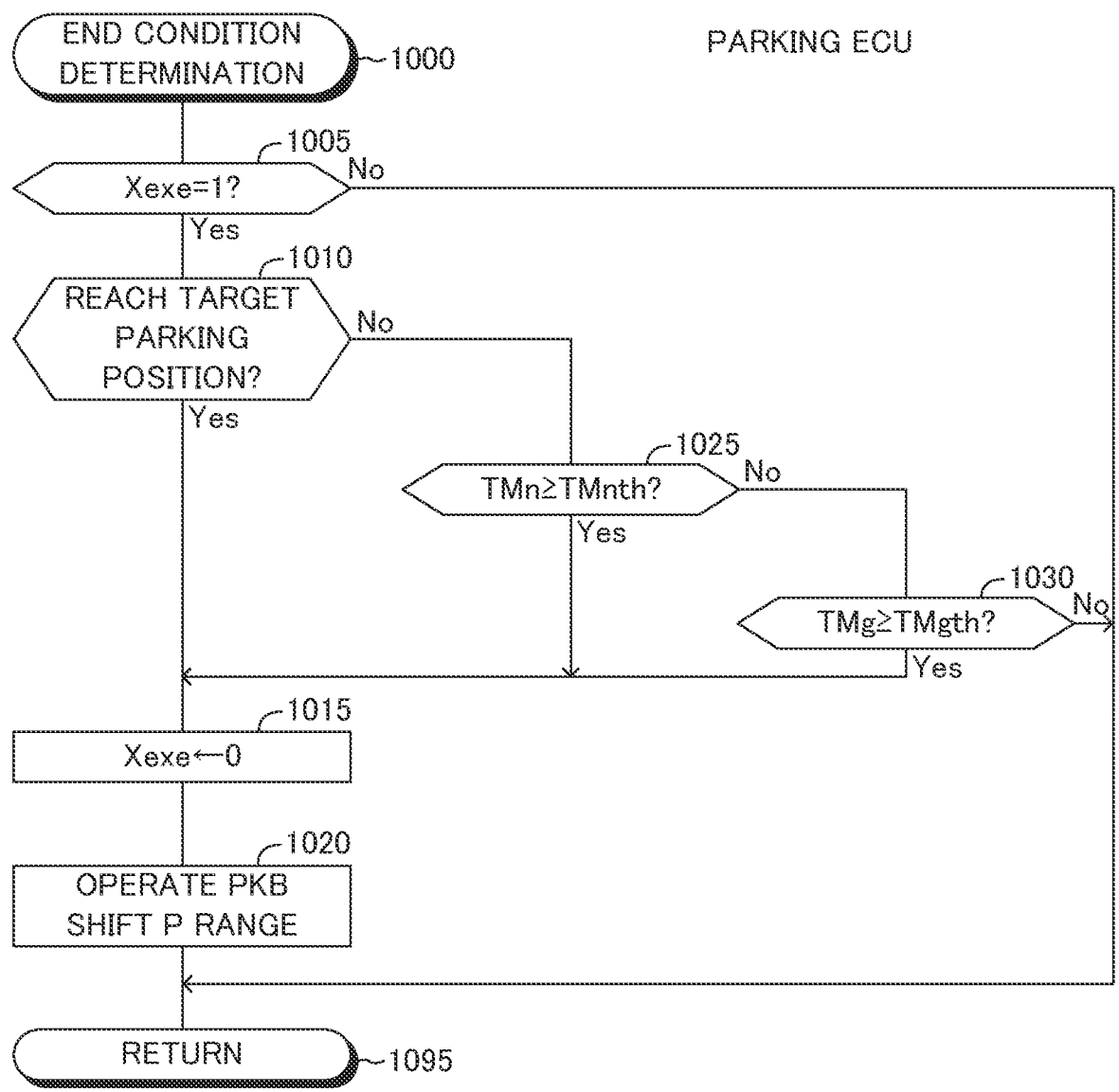
FIG. 10 is a flowchart illustrating an end condition determining routine executed by the CPU of the parking ECU.

The second CPU is configured or programmed to execute an end condition determining routine shown by a flowchart in FIG. 10 every time a predetermined time elapses. The end condition becomes satisfied when at least one of the following conditions 1-3 is satisfied.

Condition 1: the vehicle VA has reached the target parking position.

Condition 2: the value of the non-operation timer TMn has become equal to or greater than a non-operation threshold TMnth.

Condition 3: the value of the outside-range timer TMg has become equal to or greater than an outside-range threshold TMgth.

When an appropriate time point comes, the second CPU starts processing from step 1000 in FIG. 10, and proceeds to step 1005. At step 1005, the second CPU determines whether or not the value of the execution flag Xexe is "1". When the value of the execution flag Xexe is "0", the second CPU makes a "No" determination at step 1005, and proceeds to step 1095 to terminate the present routine tentatively.

When the value of the execution flag Xexe is "1", the second CPU makes a "Yes" determination at step 1005, and proceeds to step 1010. At step 1010, the second CPU determines whether or not the vehicle VA has reached the target parking position. More specifically, the second CPU determines that the vehicle VA has reached the target parking position when a current position of the vehicle VA moving along the target route coincides with the target parking position. The current position of the vehicle VA is specified based on the vehicle speed Vs and the steering angle θs.

When the vehicle VA has reached the target parking position (namely, when the above-described condition 1 has become satisfied), the second CPU makes a "Yes" determination at step 1010, and sequentially executes the processes of step 1015 and step 1020.

Step 1015: the second CPU sets the value of the execution flag Xexe to "0".

Step 1020: the second CPU drives an unillustrated parking brake actuator and change shift positions to a parking position.

When the parking brake actuator is driven, a frictional braking force is applied to the wheels so that the vehicle is kept stopping.

Thereafter, the second CPU proceeds to step 1095 to terminate the present routine tentatively.

If the vehicle VA has not reached the target parking position when the second CPU proceeds to step 1010, the second CPU makes a "No" determination at step 1010, and proceeds to step 1025. At step 1025, the second CPU determines whether or not the value of the non-operation timer TMn is equal to or greater than the predetermined non-operation threshold TMnth.

When the value of the non-operation timer TMn is smaller than the non-operation threshold TMnth, the second CPU makes a "No" determination at step 1025, and proceeds to step 1030. At step 1030, the second CPU determines whether or not the value of the outside-range timer TMg is equal to or greater than the predetermined outside-range threshold TMgth.

When the value of the outside-range timer TMg is smaller than the outside-range threshold TMgth, the second CPU makes a "No" determination at step 1030, and proceeds to step 1095 to terminate the present routine tentatively.

If the value of the non-operation timer TMn is equal to or greater than the non-operation threshold TMnth (namely, if the above-described condition 2 has become satisfied) when the second CPU proceeds to step 1025, the second CPU makes a "Yes" determination at step 1025, and executes the processes of step 1015 and 1020. Thereafter, the second CPU proceeds to step 1095 to terminate the present routine tentatively.

If the value of the outside-range timer TMg is equal to or greater than the outside-range threshold TMgth (namely, if the above-described condition 3 has become satisfied) when the second CPU proceeds to step 1030, the second CPU makes a "Yes" determination at step 1030, and executes the processes of step 1015 and 1020. Thereafter, the second CPU proceeds to step 1095 to terminate the present routine tentatively.

As has been described above, even if the signal condition is not satisfied ("No" at step 705, "No" at step 710), the present control apparatus 10 maintains the value of the permissible flag Xkyoka at "1" when the unsatisfied state has not continued for the extension time Text ("No" at step 745). Accordingly, a "situation where the permissible flag Xkyoka is set to "0" immediately after the signal condition becomes unsatisfied so that the deceleration control starts to be executed (refer to "No" at step 910, step 940), and the remote operation control is terminated" can be prevented from occurring.

The present disclosure should not be limited to the above-described embodiment, and may employ various modifications within the scope of the present disclosure.

First Modification

A second CPU of the present control apparatus 10 according to a first modification has set the extension time Text (i.e., the threshold TMth) in advance, as follows.

The second CPU obtains a distance difference ΔD by subtracting the receivable distance Dkanou (refer to FIG. 2) from the permissible distance Dkyoka (refer to FIG. 2).

The second CPU obtains a required time Tn by dividing the above-described distance difference ΔD by a particular speed. The required time Tn is a time that it takes for an object (a vehicle or a user) whose speed is the particular speed to move for the distance difference ΔD. The particular speed is either the control vehicle speed Vc or a walking speed Vw, whichever is higher.

The second CPU has set the extension time Text to a time equal to or shorter than the required time Tn.

The thus configured first modification can decrease a possibility that the electronic key 23 is located outside the receivable range Rkanou when the unsatisfied state continues for the extension time Text because the electronic key 23 is located outside the permissible range Rkyoka. Therefore, a possibility that the present control apparatus 10 determines that the permissible condition is satisfied so as to perform the remote operation control even when the electronic key 23 is located outside the permissible range Rkyoka can be reduced.

For example, under the following assumption, the extension time Text is set at 2.0 seconds.
  permissible distance Dkyoka: 6.0 m
  receivable distance Dkanou: 3.0 m
  control vehicle speed Vc: 0.55 m/s
  walking speed Vw: 1.1/s In this case, the distance difference ΔD is "3.0 m", and the walking speed Vw is higher than the control vehicle speed Vc. Therefore, the required time Tn is 2.7 s (=3.0/1.1). The extension time Text is set 2.0 s that is shorter than 2.7 s.

Second Modification

The present control apparatus 10 according to a second modification obtains a terminal distance D that is a distance between the electronic key 23 and the vehicle VA (more precisely, a position of the vehicle outside receiving antennas 22) based on the response signal, and sets/determines the extension time (namely, the threshold TMth) based on the terminal distance D.

<Response Signal Receiving Routine>

Figure 11:
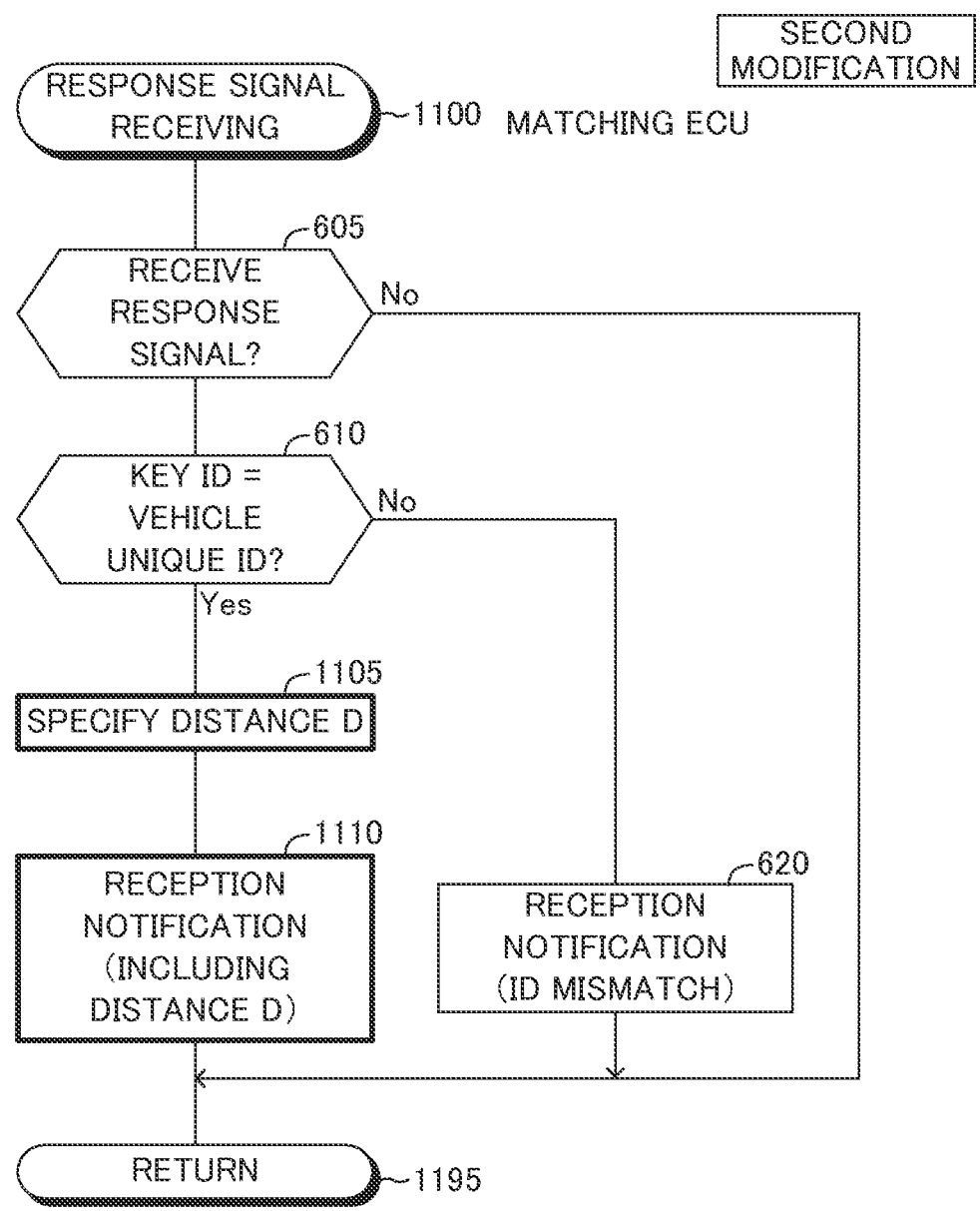
FIG. 11 is a flowchart illustrating a response signal receiving routine executed by a CPU of a matching ECU of a second modification according to the present disclosure.

A first CPU of a matching ECU 20 according to the second modification is configured or programmed to execute a response signal receiving routine shown by a flowchart in FIG. 11 in place of FIG. 6 every time a predetermined time elapses.

It should be noted that a step shown in FIG. 11 for executing the same process as the process of the step shown in FIG. 6 is provided with the same reference as one used for that step shown in FIG. 6, and will not be described.

When an appropriate time point comes, the first CPU starts processing from step 1100 in FIG. 11, and proceeds to step 605 shown in FIG. 11. When the response signal has not been received, the first CPU makes a "No" determination at step 605 shown in FIG. 11, and proceeds to step 1195 to terminate the present routine tentatively.

When the vehicle outside receiving antenna 22 has received the response signal, the first CPU makes a "Yes" determination at step 605 shown in FIG. 11, and proceeds step 610.

When the key ID does not coincide with (match) the vehicle unique ID, first CPU makes a "No" determination at step 610 shown in FIG. 11, and transmits the reception notification including the ID mismatch information at step 620 shown in FIG. 11. Thereafter, the first CPU proceeds to step 1195 to terminate the present routine tentatively.

When the key ID coincides with (matches) the vehicle unique ID, first CPU makes a "Yes" determination at step 610 shown in FIG. 11, and sequentially executes the processes of step 1105 and step 1110.

Step 1105: the first CPU specifies the terminal distance D based on a strength (intensity) of the response signal.

Step 1110: the first CPU transmits the reception notification including ID match information and distance information indicative of the terminal distance D to the parking ECU 30. Thereafter, the first CPU proceeds to step 1195 to terminate the present routine tentatively.

Figure 12:
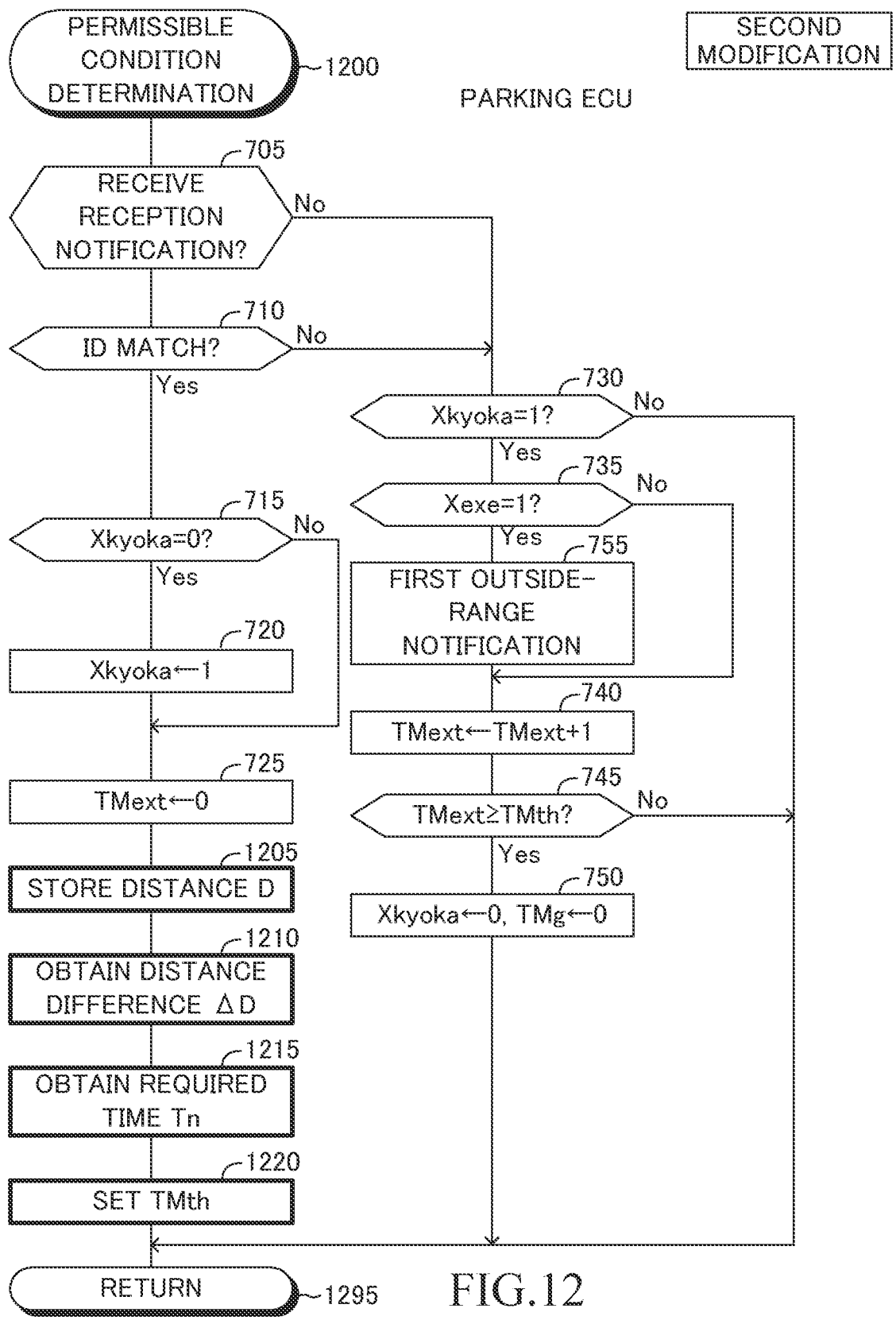
FIG. 12 is a flowchart illustrating a permissible condition determining routine executed by a CPU of a parking ECU of the second modification according to the present disclosure.

The second CPU of the second modification is configured or programmed to execute a permissible condition determination routine shown by a flowchart in FIG. 12 in place of FIG. 7, and to execute the routines shown in FIGS. 8 to 10, every time a predetermined time elapses.

It should be noted that a step shown in FIG. 12 for executing the same process as the process of the step shown in FIG. 7 is provided with the same reference as one used for that step shown in FIG. 7, and will not be described.

<Permissible Condition Determination Routine>

When an appropriate time point comes, the second CPU starts processing from step 1200 in FIG. 12, and proceeds to step 705 shown in FIG. 12. The second CPU makes a "Yes" determination at step 705 shown in FIG. 12 when the second CPU receives the reception notification, and the second CPU makes a "Yes" determination at step 710 shown in FIG. 12 when the ID match information is included in the received reception notification. Thereafter, the second CPU sets the value of the permissible flag Xkyoka to "1" at step 720 shown in FIG. 12 when the value of the value of the permissible flag Xkyoka is "0", and then, sets the value of the extension timer TMext to "0" at step 725 shown in FIG. 12. The second CPU proceeds to step 725 shown in FIG. 12 from step 715 shown in FIG. 12, when the value of the permissible flag Xkyoka is "1".

After the second CPU executes the process of step 725 shown in FIG. 12, the second CPU sequentially executes the processes of step 1205 to step 1220.

Step 1205: the second CPU specifies the terminal distance D indicated by the distance information included in the reception notification, and stores the terminal distance Din the RAM of the parking ECU 30. More specifically, the RAM has a plurality of storage areas (distance storage areas) for storing the terminal distance D. The second CPU overwrites/replace the oldest terminal distance D stored in one of the storage areas with the terminal distance D specified at step 1205.

Step 1210: the second CPU obtains the distance difference ΔD by subtracting the terminal distance D from the permissible distance Dkyoka.

Step 1215: the second CPU obtains the required time Tn by dividing the above-described distance difference ΔD by a particular speed. The particular speed is either the control vehicle speed Vc or the walking speed Vw, whichever is higher.

Step 1220: the second CPU sets the threshold TMth in such a manner that the extension time Text is equal to or shorter than the required time Tn, and store that threshold TMth in the RAM of the parking ECU 30. More specifically, there is one threshold storing area for storing the threshold TMth in the RAM, and the second CPU stores the threshold TMth set at step 1220 in the threshold storing area.

The second CPU executes the processes of "step 730 and steps after the step 730" shown in FIG. 12, when the second CPU makes a "No" determination at step 705 shown in FIG. 12, or when the second CPU makes a "No" determination at step 710 shown in FIG. 12. When the second CPU proceeds to step 745 shown in FIG. 12, reads out the threshold TMth from the threshold storing area in the RAM, and determines whether or not the value of the extension timer TMext is equal to or greater than the threshold TMth.

It should be noted that the second CPU may obtain a relative speed of the electronic key 23 with respect to the vehicle VA based on the distances D stored in a plurality of the distance storage areas in the RAM, and may obtain the required time Tn by dividing the distance difference ΔD by the obtained relative speed.

The extension time Text is set based on the distance D between the electronic key 23 and the vehicle VA. Therefore, the second modification can decrease a possibility that the electronic key 23 is located outside the permissible range Rkyoka when the unsatisfied state continues for the extension time Text. Therefore, a possibility that the remote operation control is executed even when the electronic key 23 is located outside the permissible range Rkyoka can be further reduced.

Third Modification

In a third modification, the permissible range Rkyoka is narrower/smaller than the receivable range Rkanou. In other words, the receivable distance Dkanou regarding the vehicle outside receiving antennas 22 of the third modification is longer than the permissible distance Dkyoka.

In the case where the signal condition is satisfied, the present control apparatus 10 according to the third modification sets a value of a distance flag Xkyoka to "1" when the terminal distance D specified based on the response signal is equal to or shorter than the permissible distance Dkyoka, and sets the value of the distance flag Xkyoka to "0" when the terminal distance D is longer than the permissible distance Dkyoka.

In addition, in the case where the signal condition is not satisfied, the present control apparatus 10 according to the third modification immediately sets the value of the permissible flag Xkyoka to "0" regardless of whether or not the unsatisfied state continues for the extension time Text, when the terminal distance D specified based on the response signal that was lastly obtained while the signal condition was satisfied is equal to or longer a distance threshold Dth shorter than the permissible distance Dkyoka.

The first CPU of the matching ECU 20 according to the third modification is configured to execute the response signal receiving routine shown in FIG. 11, every time a predetermined time elapses.

Figure 13:
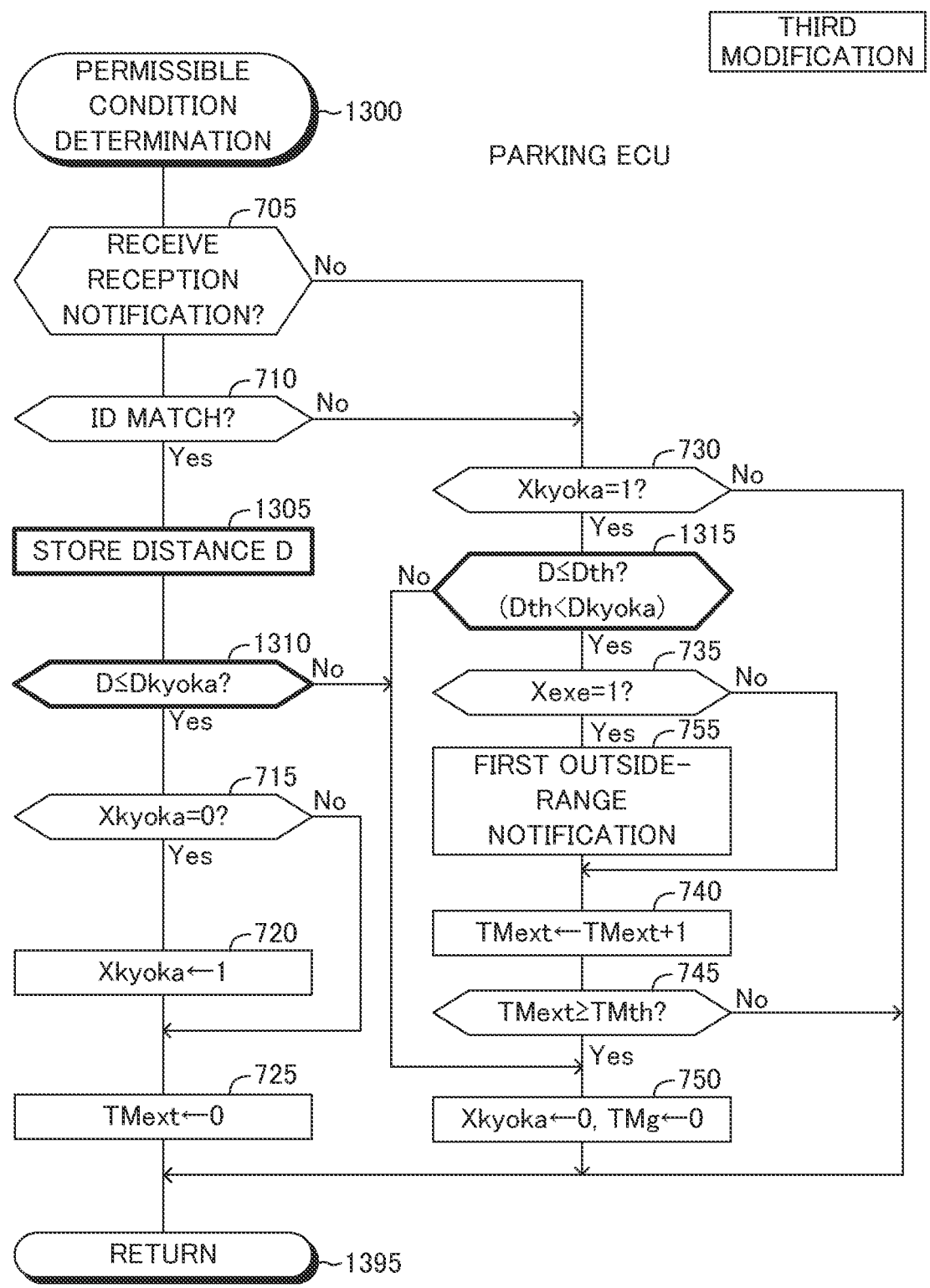
FIG. 13 is a flowchart illustrating a permissible condition determining routine executed by a CPU of a parking ECU of a third modification according to the present disclosure.

The second CPU of the parking ECU 30 according to the third modification is configured to execute a permissible condition determination routine shown by a flowchart in FIG. 13 in place of FIG. 7, and to execute the routines shown in FIGS. 8 to 10, every time a predetermined time elapses.

It should be noted that a step shown in FIG. 13 for executing the same process as the process of the step shown in FIG. 7 is provided with the same reference as one used for that step shown in FIG. 7, and will not be described.
<Permissible Condition Determination Routine>

When an appropriate time point comes, the second CPU starts processing from step 1300 shown in FIG. 13, and proceeds to step 705 shown in FIG. 13. When the signal condition is satisfied (namely, when the reception notification is received, and the ID match information is included in the received reception notification), the second CPU makes a "Yes" determination at step 705 shown in FIG. 13 and makes a "Yes" determination at step 710 shown in FIG. 13. Thereafter, the second CPU sequentially executes the processes of step 1305 and step 1310.

Step 1305: the second CPU stores the terminal distance D included in the reception notification in the RAM of the parking ECU 30. More specifically, the RAM has one distance storage area for storing the terminal distance D. The second CPU writes the terminal distance D specified at step 1305 into the distance storage area.

Step 1310: the second CPU determines whether or not the terminal distance D is equal to or shorter than the permissible distance Dkyoka.

When the terminal distance D is equal to or shorter than the permissible distance Dkyoka, the second CPU makes a "Yes" determination at step 1310, and executes the processes of "step 715 shown in FIG. 13 and steps after the step 715" shown in FIG. 13.

Whereas, when the terminal distance D is longer than the permissible distance Dkyoka, the second CPU makes a "No" determination at step 1310, and proceeds to step 750 shown in FIG. 13 to set the value of the permissible flag Xkyoka to "0" and set the value of the outside-range timer TMg to "0". Thereafter, the second CPU proceeds to step 1395 to terminate the present routine tentatively.

In contrast, when the signal condition is not satisfied, the second CPU makes a "No" determination at either step 705 shown in FIG. 13 or step 710 shown in FIG. 13, and proceeds to step 730 shown in FIG. 13. When the value of the permissible flag Xkyoka is "0", the second CPU makes a "No" determination at 730 shown in FIG. 13, and proceeds to step 1395 to terminate the present routine tentatively.

Whereas, when the value of the permissible flag Xkyoka is "1", the second CPU makes a "Yes" determination at 730 shown in FIG. 13, and proceeds to step 1315. At step 1315, the second CPU obtains the terminal distance D specified based on the response signal that was lastly obtained while the signal condition was satisfied (i.e., the distance D stored in the distance storage area of the RAM), and determine whether or not the terminal distance D is equal to or shorter than the predetermined distance threshold Dth. The distance threshold Dth has been set at a value shorter than the permissible distance Dkyoka.

When the terminal distance D is equal to or shorter than the predetermined distance threshold Dth, the second CPU makes a "Yes" determination at 1315, and executes the processes of step 735 shown in FIG. 13 and steps after the step 735 shown in FIG. 13. When the unsatisfied state continues for the extension time Text, the second CPU sets the value of the permissible flag Xkyoka to "0" and sets the value of the outside-range timer TMg to "0". Thereafter, the second CPU proceeds to step 1395 to terminate the present routine tentatively.

When the terminal distance D is longer than the distance threshold Dth, the second CPU makes a "No" determination at 1315, and proceeds to step 750 shown in FIG. 13 regardless of whether or not the unsatisfied state continues for the extension time Text. At step 750, the second CPU sets the value of the permissible flag Xkyoka to "0" and sets the value of the outside-range timer TMg to "0". Thereafter, the second CPU proceeds to step 1395 to terminate the present routine tentatively.

According to the third modification, the permissible range Rkyoka is narrower than the receivable range Rkanou. Therefore, even when the electronic key 23 is located in the weak signal strength area Awk, a possibility that the remote operation control is terminated can be decreased.

In addition, after the signal condition become unsatisfied, and when the terminal distance D specified based on the response signal that was lastly obtained while the signal condition was satisfied is longer than the distance threshold Dth, the value of the permissible flag Xkyoka is set to "0" regardless of whether or not the unsatisfied state continues for the extension time Text. Therefore, a possibility that the remote operation control is performed despite that the electronic key 23 is located outside the permissible range Rkyoka can be decreased.

Fourth Modification

In the above-described embodiment, the remote operation control is the "control to cause the vehicle VA to move to the target parking position along the target route, in accordance with the operations by the user". However, the remote operation control should not be limited to the above-described control. For example, the remote operation control may be a control to cause the vehicle VA to move forward or backward in accordance with the operations by the user.

Fifth Modification

In the above-described embodiment, the user performs the remote operation control by performing the operations to the operation area 522 of the operation screen 520 displayed on the mobile terminal 26, however, the user may perform the remote operation control by performing operations to the electronic key 23. For example, the electronic key 23 may comprise a touch panel type display, and the user may perform operations to an operation area 522 of an operation screen 520 displayed on this display of the electronic key 23 to perform the remote operation control.

In addition, the mobile terminal 26 may have/implement the same functions as those of the electronic key 23. Such a mobile terminal 26 transmits the response signal (terminal signal) when it receives the request signal. In this case, the request signal may be transmitted from the DCU 25, and the response signal may be received by the DCU 25.

Sixth Modification

The number and the location of the vehicle outside transmitting antenna 21 and the vehicle outside receiving antennas 22 should not be limited to those described in the above.

Seventh Modification

The present control apparatus 10 can be applied not only to the above-described vehicle with the internal combustion engine, but also to one of a Hybrid Electric Vehicle (HEV), a Plug-in Hybrid Electric Vehicle (PHEV), a Fuel Cell Electric Vehicle (FCEV), and a Battery Electric Vehicle (BEV).

The present disclosure may be applied to an autonomous driving vehicle.

What is claimed is:
1. A vehicle control apparatus comprising:
a radio receiver, mounted on a vehicle, configured to be capable of wirelessly receiving a terminal signal transmitted by a first terminal carried by a user located outside said vehicle;
a control unit configured to be capable of performing a remote operation control to move said vehicle, in accordance with a remote operation, to said first terminal or to a second terminal different from said first terminal, said remote operation being performed by said user located outside said vehicle;
wherein,
said control unit is configured to:
perform said remote operation control in accordance with said remote operation, when said user is located within a permissible range that is a range within a predetermined permissible distance from said vehicle and a signal condition is satisfied, the signal condition being satisfied when said terminal signal is capable of being received;
in a case in which said signal condition becomes unsatisfied while performing said remote operation control, continue performing said remote operation control when an unsatisfied state in which said signal condition is not satisfied has not yet continued for a predetermined extension time; and
stop performing said remote operation control when said unsatisfied state has continued for said extension time,
and wherein,
said radio receiver is configured to be capable of receiving said terminal signal when said terminal signal is transmitted by said first terminal located within a receivable distance from said vehicle, said receivable distance being shorter than said permissible distance.
2. The vehicle control apparatus according to claim 1, wherein said remote operation control is prohibited from being performed when said user is located outside said permissible range.
3. The vehicle control apparatus according to claim 2, wherein
said control unit is configured to set said extension time based on a distance obtained by subtracting said receivable distance from said permissible distance, and a predetermined speed.
4. The vehicle control apparatus according to claim 2, wherein,
said control unit is configured to:
set said extension time based on a distance obtained by subtracting a terminal distance that is a distance between said first terminal and said vehicle from said permissible distance, wherein said terminal distance is specified based on said terminal signal, when said signal condition is satisfied; and
determine whether or not said unsatisfied state has continued for said extension time that was set when said signal condition was lastly satisfied, when said signal condition is unsatisfied.

* * * * *